SUBSCRIBER-EFFECTED AUTOMATIC REDIALING
FOR PATHS-BUSY CONDITIONS
Filed Sept. 21, 1966
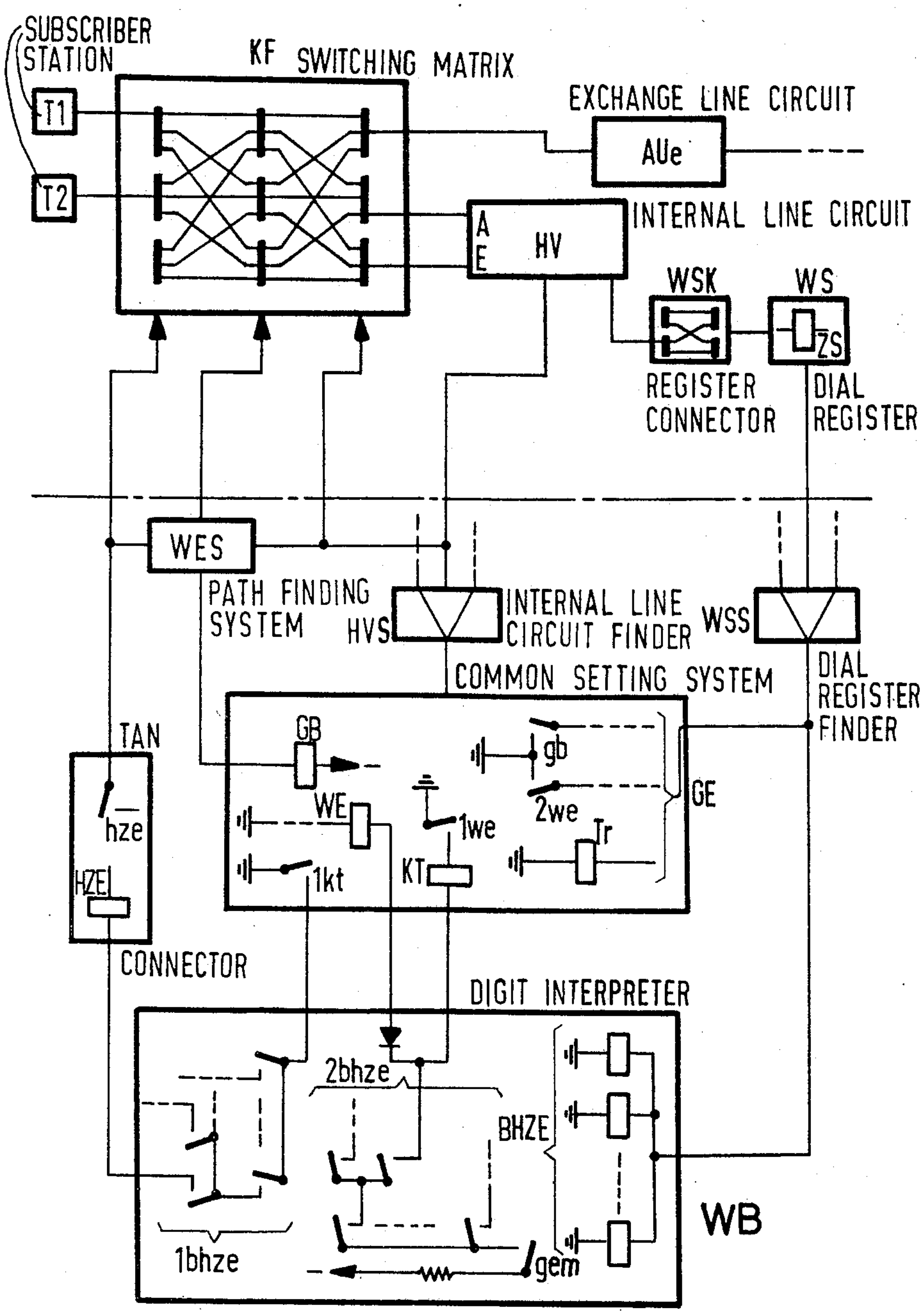

United States Patent Office 3,505,481
Patented Apr. 7, 1970

3,505,481

SUBSCRIBER-EFFECTED AUTOMATIC REDIALING FOR PATHS-BUSY CONDITIONS

Walter Strobelt, Munich, and André Friese, Gauting, near Munich, Germany, assignors to Siemens Aktiengesellschaft, Munich, Germany Filed Sept. 21, 1966, Ser. No. 580,955
Claims priority, application Germany, Sept. 30, 1965, S 99,816
Int. Cl. H04m 3/42
U.S. Cl. 179—18 4 Claims

ABSTRACT OF THE DISCLOSURE

In a telephone exchange installation, a distinction is made between subscriber-busy conditions and path-busy conditions. In the former cases, a busy signal is transmitted to the calling station, while in the latter cases, the through connection attempt is repeated, since the path-busy condition is likely to clear within a relatively short time period. The calling subscriber operates a switch to effect the automatic redialing attempts.

STATE OF THE PRIOR ART

The present invention concerns a circuit arrangement for communication exchanges systems, and in particular for centrally controlled PBX's provided with dial registers which serve for reception of dial information and emission thereof for establishment of a connection, and which further provide for repeated emission of the dial information in the case of a busy condition, to cause a repetition of the through-switching operation to set up the connection.

A circuit system of this type has become known as an automatic redialer. Such redialer may be assigned individually either to each subscriber or to each first group selector. The redialer receives dial information emitted by a calling subscriber and establishes a desired connection path simultaneously over several dial stages. After the subscriber has dialed the entire calling number, he either hears the ringing-signal and is therefore connected with the called subscriber after response of the latter, or the calling subscriber hears the busy signal. In the latter case, the calling subscriber has the opportunity to release the existing connection or partial connection, as by actuating the ground pushbutton on his station apparatus and replacing his receiver. The calling subscriber may also cause the automatic redialer automatically to attempt to complete the connection requested, at certain time intervals, with the aid of the registered dial information and with the aid of evaluation of an audible signal received over the line. If the audible signal receiver of the called redialer receives a busy signal, then the redialer releases the connection and, after a certain time period, initiates a new connection-establishing operation. However, if the audible signal receiver receives a free signal, then the redialer transmits calling current to the calling subscriber and connects the calling subscriber to the called subscriber after the called subscriber has responded. Then the redialer is again disconnected and its register cleared.

Experience has shown that the introduction of the redialer poses considerable difficulties. The repetition of the connection-establishing operation provided by the redialer provides for a considerable burden and wear and tear upon the dial connectors or selectors which may be set and released several times for the establishment of a single speaking connection. Consequently, it has been provided that redialing may be initiated only at certain time intervals corresponding to the probable time period for release of the existing connection.

GENERAL DESCRIPTION

The present invention permits a distinction to be made between two different busy situations, one being "subscriber busy" conditon, and the other being the "path-busy" condition. A path-busy condition is found to exist if no suitable path for connection between the marked free inlet and free outlet of a switching matrix is available, as may result from the busy condition of intermediate lines or couplers. A subscriber busy condition exists if the outlet of the switching matrix associated with the called subscriber line is busy, independently of the load condition of the matrix itself.

The present invention is characterized by the fact that different operations occur depending upon whether a subscriber busy condition or a path busy condition exists. For instance, if it is found that a subscriber busy condition exists, a busy signal is emitted to the calling station, which may be a subscriber, an exchange position, or similar positions. However, if a path busy condition exists, repeated attempts to complete the connection between the selected outlet and termination point in the exchange circuit system are made, in dependence upon a time-operated connecting link. Therefore, the through-switching operation is repeated without any action on the part of the calling subscriber, when a path-busy condition exists. Since the condition of the exchange circuit systems changes quite rapidly during operation of a telephone system, the possibility of completing a connection can arise very quickly after a path-busy condition is found. Accordingly, by reason of the invention it is possible to repeat the effort to complete a connection after a considerably shorter time than the average time period required for termination of an existing long distance call, without unnecessary overburdening of the exchange circuit systems. In other words, repetition of the efforts to complete a connection after a path-busy condition is found to exist can take place in a shorter time than would be desirable in the case of a subscriber-busy condition. A further advantage occurs by reason of use of the invention if that invention is employed in installations in which through switching operation over the exchange circuit systems is preceded by a path finding operation, as in the case of use of switching matrices. This advantage resides in the fact that path-busy conditions can be recognized without the necessity of a prior attempt at through switching of a connection or partial connection.

In accordance with a further development of the invention, for use in the case of subscriber busy conditions, the calling subscriber may have the opportunity to initiate redialing in the manner previously described, through a suitable switching operation, as by example depression of a ground pushbutton and replacement of the receiver. In this feature, however, the time interval between efforts at redialing would correspond to the average time period required to finish long distance calls, which time period is considerably longer than the time intervals between through switching attempts in path-busy conditions. The time interval selected for repetition of through-switching attempts therefore is fitted to the possibility of success, as determined by experience, for the two different types of busy conditions.

DETAILED DESCRIPTION OF THE INVENTION

The single figure shows in schematic form an operative embodiment of the invention with only those components shown which are essential in contributing to the understanding of the invention.

The drawing is divided into two parts by a horizontal dotted line. Above this line, circuit systems are shown which are necessary for completion of each connection; that is, systems which remain switched on in a connection which is to be switched through, during the entire duration of this connection or during the subscriber dial selection of the connection. Below the dotted lines are shown connecting links of a central control system which are seized only for short periods of time; that is, only during the establishment of a connection.

At KF there is shown a common switching matrix to whose inlet side a number of subscriber stations, such as T1 and T2 are connected. To the outlet side of the switching matrix KF are connected exchange line circuits such as shown at AU*e*, and internal line circuits such as shown at HV. In addition, dial registers of which one is shown at WS are provided, for reception of dial information emitted by the subscriber and for conveying such information to the central control apparatus (below the dotted line). Internal line circuits such as shown at HV and dial registers such as shown at WS are individually connected together over a dial register connector WSK.

The switching matrix KF and dial register connector WSK are common for the entire system shown in the drawing. In contrast, a number of subscriber stations such as shown at T1 and T2, of internal line circuits such as shown at HV, of exchange line circuits such as shown at AU*e*, and of dial registers such as shown at WS, are provided for the system. This number and the sizes of the matrix KF and connector WSK will of course be matched together depending upon the traffic conditions of the exchange system.

The establishment of a connection between subscriber station T1 and subscriber station T2 will be explained with the aid of the block diagram of the drawing.

It will be assumed that the subscriber at station T1 has lifted his receiver. The subscriber station T1 is then connected over the switching matrix KF with the line E of a free internal line circuit which has been selected by automatic processes. This operation is itself known and of course employs a conventional identification process. In addition, a dial register WS is connected to the free internal line circuit HV by way of dial register coupler WSK.

After these connections are made, dial tone is emitted from the dial register WS, over the internal line circuit HV, to the subscriber station T1 and the subscriber can then commence dialing the number of the called station. The establishment of the connections necessary to complete the processes so far described are conventional and need not be explained in detail in connection with the present invention.

The subscriber then dials in conventional form the number of the subscriber with whom he desires to be connected. It is assumed that that number is the number of a subscriber connected to the same exchange system, for example, the number by which the subscriber station T2 is reached.

Upon completion of reception of a digit of the dialed number in the dial register WS, that register energizes a dial register finder WSS which connects the register to a digit interpreter WB. The digit of the calling number which has been received by the dial register WS is now transmitted to the digit interpreter WB wherein it is stored in digit receiving relays. These relays conventionally would be separate for the various digits of the calling number, such as the hundred digit, the tens digit, and the unit digit. They are shown only symbolically in the drawing, and identified thereby by the letters BZHE. Their connection together and their components of course are well known and conventional.

Upon completion of reception of a digit in the digit interpreter WB, a relay (not shown) is actuated to close its contacts gem. The contacts gem are part of an energizing circuit for a relay WE in a common setting system GE, which is to be actuated only when sufficient dial information has been accumulated in the digit interpreter WB to complete the selection process. This particular evaluation process is completed by the contact pyramid of conventional form indicated schematically at 2*bzhe*. When the registered dial information is sufficient for completion of a connection, the contact pyramid 2*bzhe* completes an energizing circuit for dial termination relay WE through a decoupling rectifier and the contacts gem. The operation of relay WE signifies the end of the dialing information and that the establishment of the connection can be initiated.

Upon operation of dial termination relay WE, the relay KT is actuated in the common setting system GE, by reason of actuation of contacts 1*we* of the relay WE. By energization of relay KT, the common setting system GE is informed that the calling number is that of a subscriber connected to the same exchange system. This means that the seized internal line circuit HV is to be connected over the switching matrix KF with the subscriber station T2 identified by the called number. Energization relay KT causes closure of its contacts 1*kt* to complete a connection through a second contact pyramid 1*bzhe*, in the digit interpreter WB, to convey the dial information stored in the interpreter to a subscriber connector TAN. The dial information is received in connector TAN in receiving relays of which only a single one identified by the letters HZE is shown. The relay set, similarly to that of the dial evaluator WB, may be divided into relays for the hundreds, tens and units digits. The dial information stored in the connector TAN may then be connected to the switching matrix KF and the pathfinder system WES, over contacts of these relays. The pathfinder system WES will contain a register of conventional form which will store the instantaneous condition of all parts of the switching matrix KF.

The subscriber to be called in accordance with the information dialed by subscriber T1 is now unmistakably marked by the above-described circuit processes.

It is also necessary that the internal line circuit HV which was seized by the calling subscriber be identified. For this purpose a set of contacts 2*we* of the dial termination relay WE completes a connection to the dial register finder WSS, which supplies a signal over the dial register WS, the dial register connector WSK, and the internal line circuit HV, to the internal line circuit finder HVS. The internal line circuit finder HVS then sets itself to the identified internal line circuit HV with which the called subscriber is to be connected. The information identifying this internal line circuit is supplied to the pathfinder system WES and the pathfinder system must now ascertain a free connection path between the inlet and line circuit HV. A large number of pathfinding processes dialed subscriber T2 and the outlet A of the internal lin ecircuit HV. A large number of pathfinding processes are known for this function and of course need not be described herein.

After a connection path has been ascertained by the path finding system WES, employing free intermediate lines between the connectors of free connecting stages of the switching matrix KF, the outlet of the internal line circuit HV and the subscriber station T2 are connected together over the switching matrix KF. This connecting or switching operation can also be carried out by the pathfinding system WES.

It is also, of course, possible that no free connection path can be found through the switching matrix between the dialed subscriber T2 and the outlet A of the internal connection circuit HV, because of the busy condition of intermediate lines suitable for this connection process. It is conventional to speak of this condition as "innerblocking" of the switching matrix. This innerblocking condition is recognized by the pathfinding system WES and that recognition transmitted therefrom to the common setting system GE, to cause operation of relay GB, Energization of this path busy relay GB causes closure of contacts *gb* of that relay to cause release of the dial register finder WSS, by an actuating voltage connection to the dial register WS from the contacts *gb*. These contacts may also cause actuation of a switch element ZS, such as a delayed release relay, shown in dial register WS. Through release of the dial register finder WSS, the connections between the digit register WS and the dial interpreter WB, and the common setting system GE, are disconnected, so that all connecting links of the central control system return to their rest positions. As a result, also, the internal line circuit finder HVS, the subscriber connector TAN, and the path finding system WES return to their rest positions.

After expiration of the controllable time period, set by the dropout time of the aforementioned time switch ZS (for example, this time period can be one second), once again the dial register WS will emit a demand signal to the dial register finder WSS, since the dialed signal is still stored therein and the inhibition of the demand signal by operation of relay ZS will no longer be effective. The finder WSS then again connects the dial register WS with the digit interpreter WB, and the processes already described are repeated. This series of steps can be repeated until a free internal path has been found between the outlet of the connection line circuit HV and the called subscriber T2, whereupon the desired connection is switched through over the switching matrix KF.

When the pathfinder system WES determines that a connection can be completed to the switching matrix, a check is made with the aid of internal line circuit HV, to determine whether the called subscriber T2 is free. If this is the case, the connection between the two subscribers T1 and T2 is then switched through. However, if the called subscriber T2 is busy, the house connection set HV operates to supply a busy signal to the calling subscriber T1 in usual conventional form. Then, if the calling subscriber has the capability of connecting to an existing connection, he may do so by pressing a suitable button, such as a ground pushbutton, to be connected to the busy called subscriber T2. However, this particular feature is of no further interest in connection with the present invention.

After the through switching operation over the switching matrix KF, the dial register WS is cleared. The connections switched through to it over the dial register connector WSK and the dial register finder WSS are disconnected, and the entire central control system (below the dotted line) returns to its rest condition.

In accordance with the above-described circuit arrangement, it is possible to distinguish busy conditions according to their particular types. In a case of innerblockage or blocking of the switching matrix KF, a through connection is repeatedly initiated in a certain cycle, until the through connection proceeds successfully. However, if a busy condition is not due to innerblocking of the switching matrix KF, but rather the dialed subscriber is busy, then a busy signal is merely switched onto the calling subscriber line.

If innerblocking of the switching matrix KF prevents a through switching process from proceeding, and the central control system is demanded in the manner described above repetitively by the dial register WS, the central control system is of course available in the time interval between such repetitive demands for other exchange processes. The cycle of repetition is selected in such manner that the time interval between two through-switching attempts is selected in accordance with the time period within which the condition of the switching matrix has probably changed from intermediate lines busy to intermediate lines free. However, in the case of the subscriber busy condition, no repeated through switching attempts are initiated, since the time period within which a busy subscriber disconnects his call connection is generally considerably longer than the time period within which the condition of the switching matrix changes. By reason of limitation of the repetition of through-switching attempts to path-busy conditions, the cycle within which repetition is periodically initiated can be selected in such manner that the calling subscriber does not have to wait for a long time period, in contrast to the prior automatic redialer technique, but rather he receives his desired connection within a few seconds.

It is also possible with the system of the invention repeatedly to initiate a through-connection attempt for the case of a subscriber busy condition. For this purpose, after the internal line circuit HV checks and ascertains that the dialed subscriber is busy, at first a busy signal is sent to the calling subscriber. In this case, the dial register is not then released. Rather, through actuation of his ground pushbutton, the calling subscriber may emit a signal to the dial register WS which, under these additional conditions, will not disconnect itself upon the ascertainment of the busy condition of the called subscriber. Then, the still-connected dial register may recognize the replacement of the receiver of the calling subscriber as an instruction to repeat the through-switching attempts, but at a greater interval than in the case of a path-busy condition.

The application of the invention to an exchange installation having a switching matrix over which connections are switched through only after a preceding pathfinding operation, makes it possible that the entire condition of the switching matrix be examined, during repetition of through-switching attempts, so that an unnecessary setting of coupling points is completely avoided if an innerblocking of the switching matrix exists.

It is also possible with the system of the invention by slight alterations of the previously described circuit arrangement, to limit the repetition of the pathfinding operation to certain operational conditions which are to be given priority. For instance, repetition of the pathfinding process can be limited to connections to be established by the central exchange system. Also, it is independently possible to initiate repetition of the pathfinding process only if a special command for this purpose is provided by a calling subscriber, such command being for example depression of a ground pushbutton. For this purpose it is necessary that the dial information remain registered in the dial register WS during a certain storage period, or until release of the calling subscriber.

The repeated initiation of a pathfinding operation can also be applied advantageously to the case of automatic exchange operation. Through connection of calls arriving over line circuits to special subscribers may be included in such an automatic exchange operation, as for example when the special subscriber has a night-connection facility by which arriving exchange office calls are referred to special night installations. Another special automatic operation occurs in the case of what are called "continuation" calls, so that it a called subscriber does not call within a certain time period, the call is switched to another subscriber. In such case the connection to the first called subscriber is released and another connection is established for the alternative subscriber.

In these two cases of automatic exchange operation, namely night connection and continuation calls, the information for establishment of a connection is registered permanently not in a dial register WS, but in a call converter, since this information must be available upon each call and is not known to the calling subscriber. The call converter which supplies the information necessary for a forward exchange of incoming exchange office calls to certain secondary station subscribers is to be considered in interpreting the present invention as performing the function of the dial register designated in the following claims.

The described repetition of the pathfinding process can also be employed for through-dialing traffic provided for incoming exchange office connections. In this connection, the dial information emitted by the calling exchange office subscriber which is necessary for the setting of exchange connecting links will also be registered within the P.B.X. installation described herein. This dial information is then repeatedly provided upon repetition of the initiation of the pathfinding operation, by a corresponding dial register.

It will be evident that it is possible in all of the above-described special operational cases, to permit the repetition of the initiation of the pathfinding process for one or for several repetitions, in order to give special connection establishment priority over other connections desires.

It will also be evident that a number of minor modifications could be made in the system described herein, without departure from the scope of the invention. Accordingly, the invention is not to be considered limited to the system specifically described in this application, but rather only by the scope of the appended claims.

We claim:

1. In a circuit arrangement for communication exchange installations, with dial registers which serve for reception of dial information and emission thereof for establishment of a connection, and which also serve to emit the dial information repetitively to cause repetitive through-switching attempts upon busy conditions, the improvement comprising:

means responsive to path-busy conditions to cause repetitive through-switching attempts after short time delays therebetween until a free path is located, and responsive to subscribers-busy conditions to supply a busy signal to the calling subscriber.

2. The apparatus of claim 1 in which said responsive means includes a timer switching element actuated upon each determination of a path-busy condition to determine the time delay between repetitions of the through-switching attempts.

3. The apparatus of claim 2 in which said exchange includes a switching matrix and a path finder system therefor operative when unable to find a free connection path through the matrix to furnish a path-busy response, said responsive means including a path busy relay connected to said path finder system to be operated upon appearance of said path-busy response, said relay having contacts actuated upon operation of the relay to actuate said timer switching element.

4. The apparatus of claim 3 in which said time delay determined by said timer switching element is of the order of one second.

References Cited

UNITED STATES PATENTS

| | | |
|---|---|---|
| 2,621,255 | 12/1952 | Mercer. |
| 3,214,523 | 10/1965 | Hess. |
| 3,381,095 | 4/1968 | Baker et al. |
| 3,344,235 | 9/1967 | Green et al. |

KATHLEEN H. CLAFFY, Primary Examiner

T. W. BROWN, Assistant Examiner